United States Patent
Lee et al.

(10) Patent No.: US 9,935,335 B2
(45) Date of Patent: Apr. 3, 2018

(54) NON-AQUEOUS ELECTROLYTE SOLUTION FOR LITHIUM SECONDARY BATTERY AND LITHIUM SECONDARY BATTERY COMPRISING THE SAME

(71) Applicant: LG CHEM, LTD., Seoul (KR)

(72) Inventors: Jung Hoon Lee, Daejeon (KR); Chul Haeng Lee, Daejeon (KR); Kyoung Ho Ahn, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 15/373,178

(22) Filed: Dec. 8, 2016

(65) Prior Publication Data

US 2017/0162905 A1    Jun. 8, 2017

(30) Foreign Application Priority Data

Dec. 8, 2015   (KR) .......................... 10-2015-0174232

(51) Int. Cl.
| | | |
|---|---|---|
| H01M 6/16 | (2006.01) | |
| H01M 10/0567 | (2010.01) | |
| H01M 4/485 | (2010.01) | |
| H01M 10/0525 | (2010.01) | |
| H01M 10/0569 | (2010.01) | |
| H01M 10/052 | (2010.01) | |
| H01M 10/0568 | (2010.01) | |
| H01M 4/02 | (2006.01) | |

(52) U.S. Cl.
CPC ....... *H01M 10/0567* (2013.01); *H01M 4/485* (2013.01); *H01M 10/052* (2013.01); *H01M 10/0525* (2013.01); *H01M 10/0568* (2013.01); *H01M 10/0569* (2013.01); *H01M 2004/027* (2013.01); *H01M 2300/0025* (2013.01)

(58) Field of Classification Search
CPC ........... H01M 10/0567; H01M 10/052; H01M 10/0568; H01M 4/485; H01M 10/0569; H01M 10/0525; H01M 2004/027; H01M 2300/0025
USPC ......................................................... 429/332
See application file for complete search history.

(56) References Cited

U.S. PATENT DOCUMENTS

2011/0081582 A1*  4/2011  Park .................. H01M 10/0567
                                                              429/330

FOREIGN PATENT DOCUMENTS

| KR | 10-2007-0031806 | * | 3/2007 | ......... H01M 10/052 |
| KR | 10-2007-0031806 | A | 3/2007 | |
| KR | 10-2015-0062154 | * | 6/2015 | ......... H01M 10/052 |
| KR | 10-2015-0062154 | A | 6/2015 | |

\* cited by examiner

*Primary Examiner* — Gary Harris
(74) *Attorney, Agent, or Firm* — Lerner, David, Littenberg, Krumholz & Mentlik, LLP

(57) ABSTRACT

The present invention relates to a non-aqueous electrolyte solution for a lithium secondary battery and a lithium secondary battery including the same, and more particularly, to a non-aqueous electrolyte solution for a lithium secondary battery including an ionizable lithium salt, an organic solvent, and an additive, wherein the additive includes 1,3-propane sultone, succinic anhydride, tris(trimethylsilyl)borate, and succinonitrile in a weight ratio of 1:0.5:0.5:0.5 to 1:1:1:1, and a total amount of the additive is in a range of 2.5 wt % to 4 wt % based on a total weight of the non-aqueous electrolyte solution for a lithium secondary battery, and a lithium secondary battery including the same.

7 Claims, 8 Drawing Sheets

NON-AQUEOUS ELECTROLYTE SOLUTION FOR LITHIUM SECONDARY BATTERY AND LITHIUM SECONDARY BATTERY COMPRISING THE SAME

CROSS-REFERENCE TO RELATED APPLICATIONS

This application claims the benefit of Korean Patent Application No. 10-2015-174232, filed on Dec. 8, 2015, in the Korean Intellectual Property Office, the disclosure of which is incorporated herein in its entirety by reference.

TECHNICAL FIELD

Technical Field

The present invention relates to a non-aqueous electrolyte solution for a lithium secondary battery and a lithium secondary battery including the same, and more particularly, to a non-aqueous electrolyte solution for a lithium secondary battery, which may improve storage performance by reducing gas generation during high-temperature storage of a lithium secondary battery, and a lithium secondary battery in which life characteristics are improved by including the same.

Background Art

Recently, interests in energy storage technologies have been increasingly grown, and efforts for research and development of electrochemical devices have been gradually materialized as the application of the energy storage technologies is expanded to the energy of mobile phones, camcorders, notebook PCs, and even to electric vehicles.

There emerges an interest in the development of rechargeable secondary batteries among these electrochemical devices, and, particularly, lithium secondary batteries developed in the early 1990's are spotlighted because the lithium secondary batteries are advantageous in that they have higher operating voltage and significantly higher energy density.

A lithium secondary battery is composed of a negative electrode formed of such as a carbon material capable of intercalating and deintercalating lithium ions, a positive electrode formed of such as a lithium-containing oxide, and a non-aqueous electrolyte solution in which an appropriate amount of a lithium salt is dissolved in a mixed organic solvent.

Also, with respect to the lithium secondary battery, a layer is formed on a surface of the negative electrode while some of additive components for an electrolyte solution and organic solvents are decomposed in a voltage range of 0.5 V to 3.5 V during initial charge, and lithium ions react with the electrolyte solution on the surface of the negative electrode to form compounds, such as $Li_2CO_3$, $Li_2O$, and $LiOH$, while the lithium ions generated from the positive electrode move to the negative electrode. These compounds may form a kind of a passivation layer on the surface of the negative electrode, and the layer is denoted as a "solid electrolyte interface (SEI) film".

The SEI film formed at an initial stage of charging may prevent a reaction of the lithium ions with the carbon negative electrode or other materials during charge and discharge. Also, the SEI film may only pass the lithium ions by acting as an ion tunnel. The ion tunnel may prevent the destruction of a structure of the carbon negative electrode due to the co-intercalation of the carbon negative electrode and the organic solvents of the electrolyte solution having a high molecular weight which solvate lithium ions and moves therewith. Therefore, in order to improve high-temperature cycle characteristics and low-temperature output of the lithium secondary battery, a robust SEI film must be formed on the negative electrode of the lithium secondary battery.

In a case in which the organic solvent used in the non-aqueous electrolyte solution of the lithium secondary battery is generally stored for a long period of time at high temperature, gas is generated while the organic solvent is oxidized by a transition metal oxide of a discharged positive electrode active material, and battery deformation, for example, battery swelling or electrode assembly deformation, occurs due to the gas thus generated. Furthermore, the negative electrode is exposed while the SEI film is gradually collapsed during high-temperature storage in a fully charged state (e.g., storage at 60° C. after charged to 100% at 4.2 V), and, since gases, such as CO, $CO_2$, $CH_4$, and $C_2H_6$, are generated while the negative electrode thus exposed reacts with the electrolyte solution to continuously cause a side reaction, the deformation of the battery (battery swelling, increase in battery internal pressure) may occur. When the battery is deteriorated due to internal short circuit of the battery which is caused by the battery deformation, fire or explosion of the battery may occur.

In particular, according to the above limitation, in a case in which lithium titanium oxide (LTO) is used as a negative electrode active material, since a reduction reaction of a generally used carbonate-based solvent may be promoted due to a catalytic reaction of $Ti^{4+}$ on the surface of the LTO, the generation of the gas is further intensified.

In order to address these limitations, there is a need to develop an electrolyte solution for a lithium secondary battery having a new configuration in which stability is improved.

DISCLOSURE OF THE INVENTION

Technical Problem

An aspect of the present invention provides a non-aqueous electrolyte solution for a lithium secondary battery which may reduce an amount of gas generated during high-temperature storage.

Another aspect of the present invention provides a lithium secondary battery in which high-temperature storage characteristics and life characteristics are improved by comprising the non-aqueous electrolyte solution for a lithium secondary battery.

TECHNICAL SOLUTION

According to an aspect of the present invention, there is provided a non-aqueous electrolyte solution for a lithium secondary battery including an ionizable lithium salt; an organic solvent; and an additive, wherein the additive includes 1,3-propane sultone (PS), succinic anhydride (SA), tris(trimethylsilyl)borate (TMSB), and succinonitrile (SN) in a weight ratio of 1:0.5:0.5:0.5 to 1:1:1:1.

A total amount of the additive may be in a range of 2.5 wt % to 4 wt %, particularly 2.5 wt % to 3 wt %, based on a total weight of the non-aqueous electrolyte solution for a lithium secondary battery.

According to another aspect of the present invention, there is provided a lithium secondary battery including a negative electrode, a positive electrode, a separator disposed between the negative electrode and the positive electrode, and a non-aqueous electrolyte solution, wherein the non-aqueous electrolyte solution includes the non-aqueous electrolyte solution for a lithium secondary battery of the present invention, and the negative electrode includes a lithium titanium oxide (LTO) as a negative electrode active material.

Advantageous Effects

According to the present invention, since 4 kinds or more of additives are included at a predetermined ratio in a non-aqueous electrolyte solution, a side reaction of an electrolyte solvent with a negative electrode and a positive electrode may be reduced to reduce an amount of gas generated during high-temperature storage. Thus, since the generation of gas is suppressed even in a case in which a lithium secondary battery is used or stored for a long period of time at high temperature in a fully charged state, a lithium secondary battery having improved overall performance, such as high-temperature storage characteristics and life characteristics, may be prepared.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

MODE FOR CARRYING OUT THE INVENTION

Figure 1:
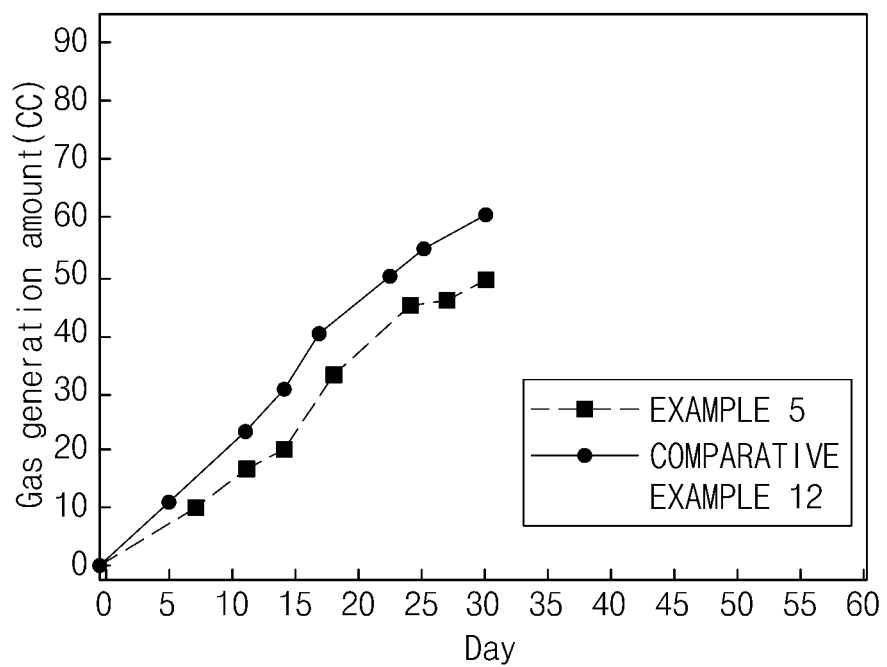
FIG. 1 is a graph illustrating a gas reduction effect according to Experimental Example 1 of the present invention.

Hereinafter, the present invention will be described in more detail.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

In general, during initial charge of a secondary battery, a solid electrolyte interface (SEI) film affecting a battery reaction is formed on a surface of a negative electrode (graphite) while an electrolyte solution is decomposed before lithium ions discharged from a positive electrode are intercalated into the negative electrode (graphite). The film not only has a property of passing the lithium ions and blocking the movement of electrons, but also acts as a protective layer that prevents continuous decomposition of the electrolyte solution. However, it is difficult to continuously maintain the performance of the formed SEI film, and the formed SEI film may be destructed by expansion and contraction due to repeated charge and discharge cycles or may be destructed by external heat and impact. When a bare surface of the electrode is exposed due to the destructed SEI film, the generation of gas is increased due to an additional reaction between a solvent and the electrode. Furthermore, when the secondary battery is left standing at high temperature in a high SOC (state of charge), swelling of the secondary battery occurs while an excessive amount of gas is discharged due to a side reaction of the positive electrode with an electrolyte, and thus, a structure of the secondary battery not only becomes unstable, but also there is a risk of explosion.

Thus, an embodiment of the present invention aims at providing a non-aqueous electrolyte solution, which may suppress the occurrence of the decomposition reaction of the solvent in each electrode by forming a stable SEI film by including an additive capable of reducing the generation of gas, and a secondary battery including the same.

Specifically, an embodiment of the present invention provides a non-aqueous electrolyte solution for a lithium secondary battery including an ionizable lithium salt; an organic solvent; and an additive, wherein the additive includes 1,3-propane sultone, succinic anhydride, tris(trimethylsilyl)borate, and succinonitrile in a weight ratio of 1:0.5:0.5:0.5 to 1:1:1:1, and the additive is included in a total amount of 2.5 wt % to 4 wt %, particularly 2.5 wt % to 3 wt %, based on a total weight of the non-aqueous electrolyte solution for a lithium secondary battery.

As described above, the non-aqueous electrolyte solution for a lithium secondary battery of the present invention may include 1,3-propane sultone as a first additive component.

Since the 1,3-propane sultone may form a stable SEI film including sulfur on surfaces of the negative electrode and positive electrode during the initial charge, the 1,3-propane sultone may reduce the generation of gas by suppressing the side reaction of the electrode with the electrolyte solution.

Also, the non-aqueous electrolyte solution for a lithium secondary battery of the present invention may include succinic anhydride and tris(trimethylsilyl)borate as second and third additive components, respectively.

The succinic anhydride and tris(trimethylsilyl)borate may suppress the side reaction of the positive electrode or the negative electrode with the electrolyte solution during high-voltage charge of the lithium secondary battery, and accordingly, the decomposition of the electrolyte solution or the generation of gas, such as $CO$, $CO_2$, $CH_4$, and $C_2H_6$, due to the side reaction may be reduced. Particularly, since the succinic anhydride may reduce the generation of gas from the negative electrode through the formation of a layer on the negative electrode and the tris(trimethylsilyl)borate may assist the formation of a thin layer on the positive electrode, an increase in resistance of the SEI film may be mitigated.

Furthermore, the non-aqueous electrolyte solution for a lithium secondary battery of the present invention may include succinonitrile as a fourth additive component.

The succinonitrile may stabilize bulk properties of the electrolyte solution through anion stabilization ($PF_6^-$ stabilization) and may suppress a reduction reaction of the electrolyte solution on the surface of lithium titanium oxide (LTO) through the adsorption of unshared electron pairs of the nitrile on the surface of the negative electrode.

In order to reduce the generation of gas and achieve improvements in high-temperature storage characteristics and life characteristics, the non-aqueous electrolyte solution for a lithium secondary battery of the present invention may include 1,3-propane sultone, succinic anhydride, tris(trimethylsilyl)borate, and succinonitrile as the additive in a weight ratio of 1:0.5:0.5:0.5 to 1:1:1:1, for example, 1:0.5:0.5:0.5.

In a case in which the weight ratio of the 1,3-propane sultone is greater than 1, since a surplus of the propane sultone compound may cause a side reaction, resistance of the battery may be increased. In contrast, in a case in which the weight ratio of the 1,3-propane sultone is less than 1, the SEI film may not be sufficiently formed on the surface of the electrode.

Also, in a case in which the weight ratio of at least one compound of the additives except for the 1,3-propane sultone (PS) is less than 0.5, a gas reduction effect may be reduced. In contrast, in a case in which the weight ratio of at least one compound of the additives except for the 1,3-propane sultone (PS) is greater than 1, the generation of gas due to an additional side reaction of the remaining additive may occur.

For example, in a case in which the weight ratio of each of the succinic anhydride, tris(trimethylsilyl)borate, and succinonitrile is less than 0.5, since the SEI film may not be sufficiently formed on the surface of the electrode, the gas reduction effect may be reduced. In contrast, in a case in which the weight ratio of each of the succinic anhydride and succinonitrile is greater than 1, the gas reduction effect may be improved, but internal resistance of the battery may be increased due to the excessive use of the additive, and thus, physical properties, such as cycle characteristics and storage characteristics, may consequently be deteriorated. Furthermore, in a case in which the weight ratio of the tris (trimethylsilyl)borate included is greater than 1, since dissolution of metal on the surface of the positive electrode may occur, a self-discharge phenomenon may occur, and thus, cell performance may be reduced.

From these results, the non-aqueous electrolyte solution of the present invention may achieve an optimal gas reduction effect without an increase in resistance when the weight ratios of the second to fourth additives satisfy the above ranges.

Furthermore, the total amount of the additive of the present invention may be in a range of 2.5 wt % to 4 wt %, particularly 2.5 wt % to 3 wt %, based on the total weight of the non-aqueous electrolyte solution for a lithium secondary battery.

The amount of the additive in the non-aqueous electrolyte solution may be determined by reaction specific surface areas of the positive electrode and the negative electrode, wherein, since the formation of the SEI film is insufficient when the amount of the additive is less than 2.5 wt %, the gas reduction effect may be insignificant. In contrast, when the amount of the additive is greater than 4 wt %, the generation of gas may be reduced due to the excessive use of the additive, but since the resistance is increased and the formation of the stable SEI film on the surface of the electrode is difficult while the side reaction occurs, the life characteristics are degraded.

Thus, since the non-aqueous electrolyte solution according the embodiment of the present invention includes 1,3-propane sultone, succinic anhydride, tris(trimethylsilyl)borate, and succinonitrile as the additive in a weight ratio of 1:0.5:0.5:0.5 to 1:1:1:1 and in an amount of 2.5 wt % to 4 wt % based on the total weight of the non-aqueous electrolyte solution, high-temperature instability of the organic solvent and the generation of gas may be effectively prevented. Specifically, since the additive components form the stable SEI film by forming an oligomer on the surface of the negative electrode through a crosslinking reaction, the decomposition of the electrolyte solution due to the reaction of the negative electrode with the electrolyte solution is suppressed, and thus, the generation of gas due to the side reaction of fluoroethylene carbonate (FEC) may be suppressed.

The non-aqueous electrolyte solution according the embodiment of the present invention may include a lithium salt and a non-aqueous organic solvent in addition to the additive for an electrolyte solution.

In the non-aqueous electrolyte solution of the present invention, the ionizable lithium salt, which is included as an electrolyte, may be used without limitation so long as it is typically used in an electrolyte solution for a lithium secondary battery. For example, the lithium salt may include $Li^+$ as a cation, and may include any one selected from the group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $BF_2C_2O_4^-$, $BC_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(F_2SO_2)_2N^-$, $CF_3CF_2(CF_3)_2CO^-$, $(CF_3SO_2)_2CH^-$, $CF_3(CF_2)_7SO_3^-$, $CF_3CO_2^-$, $CH_3CO_2^-$, $SCN^-$, and $(CF_3CF_2SO_2)_2N^-$ as an anion. The lithium salt may be used alone or in a mixture of two or more thereof, if necessary.

The lithium salt may be appropriately changed in a normally usable range, but may be included in a concentration of 0.8 M to 1.5 M in the electrolyte solution in order to obtain an optimum corrosion protection film formation effect on the surface of the electrode.

Also, the organic solvent included in the non-aqueous electrolyte solution of the present invention may be used without limitation so long as it is typically used in an electrolyte solution for a lithium secondary battery, and, for example, an ether compound, an ester compound, an amide compound, a linear carbonate compound, or a cyclic carbonate compound may be used alone or in a mixture of two or more thereof. Among these compounds, the cyclic carbonate compound, the linear carbonate compound, or a mixture thereof may be typically included.

Specific examples of the cyclic carbonate compound may be any one selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, and fluoroethylene carbonate (FEC), or a mixture of two or more thereof. Also, specific examples of the linear carbonate compound may be any one selected from the group consisting of dimethyl carbonate (DMC), diethyl carbonate (DEC), dipropyl carbonate, ethylmethyl carbonate (EMC), methylpropyl carbonate, and ethylpropyl carbonate, or a mixture of two or more thereof, but the present invention is not limited thereto.

In particular, cyclic carbonates, such as ethylene carbonate and propylene carbonate, which are known to well dissociate the lithium salt in the electrolyte due to high dielectric constants as highly viscous organic solvents, may be used among the carbonate-based organic solvents. An electrolyte solution having high electrical conductivity may be prepared when the above cyclic carbonate is mixed with low viscosity, low dielectric constant linear carbonate, such as dimethyl carbonate and diethyl carbonate, in an appropriate ratio.

Also, as the ether compound among the organic solvents, any one selected from the group consisting of dimethyl ether, diethyl ether, dipropyl ether, methylethyl ether, methylpropyl ether, and ethylpropyl ether, or a mixture of two or more thereof may be used, but the present invention is not limited thereto.

As the ester compound among the organic solvents, any one selected from the group consisting of liner esters such as methyl acetate, ethyl acetate, propyl acetate, methyl propionate, ethyl propionate, propyl propionate, and butyl propionate; and cyclic ester compounds such as γ-butyrolactone, γ-valerolactone, γ-caprolactone, σ-valerolactone, and ε-caprolactone, or a mixture of two or more thereof may be used, but the present invention is not limited thereto.

Also, according to an embodiment of the present invention, there is provided a lithium secondary battery including a negative electrode, a positive electrode, a separator disposed between the negative electrode and the positive electrode, and a non-aqueous electrolyte solution, wherein the above non-aqueous electrolyte solution includes the non-aqueous electrolyte solution of the present invention, and the negative electrode includes lithium titanium oxide (LTO) as a negative electrode active material.

Specifically, the lithium secondary battery of the present invention may be prepared by injecting the non-aqueous electrolyte solution of the present invention into an electrode assembly which is composed of the positive electrode, the negative electrode, and the separator disposed between the positive electrode and the negative electrode. In this case, those typically used in the preparation of the lithium secondary battery may all be used as the positive electrode, the negative electrode, and the separator which constitute the electrode assembly.

The negative electrode may be prepared by coating a negative electrode material mixture including a negative electrode active material, a binder, a conductive agent, and a solvent on a negative electrode collector.

The negative electrode collector generally has a thickness of 3 μm to 500 μm. The negative electrode collector is not particularly limited so long as it has conductivity without causing adverse chemical changes in the battery, and, for example, aluminum, copper, stainless steel, nickel, titanium, fired carbon, copper or stainless steel that is surface-treated with one of carbon, nickel, titanium, silver, or the like, an aluminum-cadmium alloy, or the like may be used. Also, like a positive electrode collector, the negative electrode collector may have fine surface roughness to improve bonding strength with the negative electrode active material. The negative electrode collector may have various shapes such as a film, a sheet, a foil, a net, a porous body, a foam body, a non-woven fabric body, and the like.

As described above, LTO may be included as the negative electrode active material, wherein the LTO may be represented by Formula 1 below.

$$Li_xTi_yO_4 \quad \text{[Formula 1]}$$

wherein $0.5 \leq x \leq -3$ and $1 \leq y \leq 2.5$.

Specifically, the LTO may include $Li_{0.8}Ti_{2.2}O_4$, $Li_{2.67}Ti_{1.33}O_4$, $LiTi_2O_4$, $Li_{1.33}Ti_{1.67}O_4$, or $Li_{1.14}Ti_{1.71}O_4$, and may particularly be $Li_{1.33}Ti_{1.67}O_4$ having a spinel structure in which changes in crystal structure during charge and discharge are small and reversibility is excellent.

In addition to the lithium titanium oxide (LTO), other active materials may also be included as the negative electrode active material, and, for example, a carbonaceous material such as natural graphite and artificial graphite; a complex metal oxide such as $Li_{x1}Fe_2O_3$ ($0 \leq x1 \leq 1$), $Li_{x2}WO_2$ ($0 \leq x2 \leq 1$), $Sn_{x3}Me_{1-x3}Me'_{y1}O_z$ (Me: manganese (Mn), iron (Fe), lead (Pb), or germanium (Ge); Me': aluminum (Al), boron (B), phosphorus (P), silicon (Si), Groups I, II and III elements of the periodic table, or halogen; $0 < x3 \leq 1$; $1 \leq y1 \leq 3$; $1 \leq z \leq 8$); a lithium metal; a lithium alloy; a silicon-based alloy; a tin-based alloy; a metal oxide such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; a conductive polymer such as polyacetylene; a Li—Co—Ni-based material; or a titanium oxide may be included. In this case, an amount of the LTO, for example, may be 40% to 100% based on a weight of the total negative electrode active materials.

The negative electrode active material may be included in an amount of 80 wt % to 99 wt % based on a total weight of the negative electrode material mixture.

The binder is a component that assists in the binding between the conductive agent, the active material, and the current collector, wherein the binder is commonly added in an amount of 1 wt % to 30 wt % based on the total weight of the negative electrode material mixture. Examples of the binder may be polyvinylidene fluoride (PVDF), polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene terpolymer (EPDM), a sulfonated EPDM, a styrene-butadiene rubber, a fluoro rubber, and various copolymers thereof.

The conductive agent is a component for further improving the conductivity of the negative electrode active material, wherein the conductive agent may be added in an amount of 1 wt % to 20 wt % based on the total weight of the negative electrode material mixture. Any conductive agent may be used without particular limitation so long as it has suitable conductivity without causing adverse chemical changes in the battery, and, for example, a conductive material such as: graphite such as natural graphite or artificial graphite; carbon black such as acetylene black, Ketjen black, channel black, furnace black, lamp black, and thermal black; conductive fibers such as carbon fibers and metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives may be used.

The solvent may include an organic solvent, such as water or N-methyl-2-pyrrolidone (NMP), and may be used in an amount such that desirable viscosity is obtained when the negative electrode active material as well as selectively the binder and the conductive agent are included. For example, the solvent may be included so that a concentration of solid content including the negative electrode active material as well as selectively the binder and the conductive agent is in a range of 50 wt % to 95 wt %, for example, 70 wt % to 90 wt %.

The positive electrode may be prepared by coating a positive electrode material mixture including a positive electrode active material, a binder, a conductive agent, and a solvent on a positive electrode collector.

The positive electrode collector is not particularly limited so long as it has high conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used.

The positive electrode active material is a compound capable of reversibly intercalating and deintercalating lithium, wherein the positive electrode active material may specifically include a lithium composite metal oxide including lithium and at least one metal such as cobalt, manganese, nickel, or aluminum. Specifically, the lithium composite metal oxide may include lithium-manganese-based oxide (e.g., $LiMnO_2$, $LiMn_2O_4$, etc.), lithium-cobalt-based oxide (e.g., $LiCoO_2$, etc.), lithium-nickel-based oxide (e.g., $LiNiO_2$, etc.), lithium-nickel-manganese-based oxide (e.g., $LiNi_{1-Y}Mn_YO_2$ (where $0<Y<1$), $LiMn_{2-Z1}Ni_{Z1}O_4$ (where $0<Z1<2$), etc.), lithium-nickel-cobalt-based oxide (e.g., $LiNi_{1-Y1}Co_{Y1}O_2$ (where $0<Y1<1$), lithium-manganese-cobalt-based oxide (e.g., $LiCo_{1-Y2}Mn_{Y2}O_2$ (where $0<Y2<1$), $LiMn_{2-Z1}Co_{z1}O_4$ (where $0<Z1<2$), etc.), lithium-nickel-manganese-cobalt-based oxide (e.g., $Li(Ni_pCo_qMn_{r1})O_2$ (where $0<p<1$, $0<q<1$, $0<r1<1$, and $p+q+r1=1$) or $Li(Ni_{p1}Co_{q1}Mn_{r2})O_4$ (where $0<p1<2$, $0<q1<2$, $0<r2<2$, and $p1+q1+r2=2$), etc.), or lithium-nickel-cobalt-transition metal (M) oxide (e.g., $Li(Ni_{p2}CO_{q2}Mn_{r3}M_{S2})O_2$ (where M is selected from the group consisting of aluminum (Al), iron (Fe), vanadium (V), chromium (Cr), titanium (Ti), tantalum (Ta), magnesium (Mg), and molybdenum (Mo), and p2, q2, r3, and s2 are atomic fractions of each independent elements, wherein $0<p2<1$, $0<q2<1$, $0<r3<1$, $0<S2<1$, and $p2+q2+r3+S2=1$), etc.), and any one thereof or a compound of two or more thereof may be included. Among these materials, in terms of the improvement of the capacity characteristics and stability of the battery, the lithium composite metal oxide may include $LiCoO_2$, $LiMnO_2$, $LiNiO_2$, lithium nickel manganese cobalt oxide (e.g., $Li(Ni_{0.6}Mn_{0.2}Co_{0.2})O_2$, $Li(Ni_{0.5}Mn_{0.3}Co_{0.2})O_2$, or $Li(Ni_{0.8}Mn_{0.1}Co_{0.1})O_2$), or lithium nickel cobalt aluminum oxide (e.g., $Li(Ni_{0.8}Co_{0.15}Al_{0.05})O_2$, etc.). In consideration of a significant improvement due to the control of type and content ratio of elements constituting the lithium composite metal oxide, the lithium composite metal oxide may include $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, or $Li(Ni_{0.8}Mn_{0.1}Co_{0.1})O_2$, and any one thereof or a mixture of two or more thereof may be used.

The positive electrode active material may be included in an amount of 80 wt % to 99 wt % based on a total weight of the positive electrode material mixture.

The binder is a component that assists in the binding between the active material and the conductive agent and in the binding with the current collector, wherein the binder is commonly added in an amount of 1 wt % to 30 wt % based on the total weight of the positive electrode material mixture. Examples of the binder may be polyvinylidene fluoride, polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene terpolymer (EPDM), a sulfonated EPDM, a styrene-butadiene rubber, a fluoro rubber, various copolymers, and the like.

The conductive agent is commonly added in an amount of 1 wt % to 30 wt % based on the total weight of the positive electrode material mixture.

Any conductive agent may be used without particular limitation so long as it has suitable conductivity without causing adverse chemical changes in the battery, and, for example, a conductive material such as: graphite; a carbon-based material such as carbon black, acetylene black, Ketjen black, channel black, furnace black, lamp black, and thermal black; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives may be used. Specific examples of a commercial conductive agent may be acetylene black-based products (Chevron Chemical Company, Denka black (Denka Singapore Private Limited), or Gulf Oil Company), Ketjen black, ethylene carbonate (EC)-based products (Armak Company), Vulcan XC-72 (Cabot Company), and Super P (Timcal Graphite & Carbon).

The solvent may include an organic solvent, such as N-methyl-2-pyrrolidone (NMP), and may be used in an amount such that desirable viscosity is obtained when the positive electrode active material as well as selectively the binder and the conductive agent are included. For example, the solvent may be included so that a concentration of solid content including the positive electrode active material as well as selectively the binder and the conductive agent is in a range of 50 wt % to 95 wt %, for example, 70 wt % to 90 wt %.

Also, a typical porous polymer film used as a typical separator, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, may be used alone or in a lamination therewith as the separator. Also, a typical porous nonwoven fabric, for example, a nonwoven fabric formed of high melting point glass fibers or polyethylene terephthalate fibers may be used, but the present invention is not limited thereto.

A shape of the lithium secondary battery of the present invention is not particularly limited, and a cylindrical type using a can, a prismatic type, a pouch type, or a coin type may be used.

Hereinafter, the present invention will be described in more detail according to examples. However, the invention may be embodied in many different forms and should not be construed as being limited to the embodiments set forth herein. Rather, these example embodiments are provided so that this description will be thorough and complete, and will fully convey the scope of the present invention to those skilled in the art.

EXAMPLES

I. Non-Aqueous Electrolyte Solution Preparation

Example 1. Non-Aqueous Electrolyte Solution Preparation

A 1M $LiPF_6$ electrolyte solution (100 g) was prepared in which propylene carbonate (PC), ethylmethyl carbonate (EMC), and dimethyl carbonate (DMC) were included in a ratio of 2:4:4 (vol %). A non-aqueous electrolyte solution of the present invention was prepared by adding 2.5 wt % of an additive (weight ratio of 1,3-propane sultone (PS):succinic anhydride (SA):tris(trimethylsilyl)borate (TMSB):succinonitrile (SN)=1:0.5:0.5:0.5) based on 100 wt % of the electrolyte solution (see Table 1 below).

Example 2. Non-Aqueous Electrolyte Solution Preparation

A 1M LiPF$_6$ electrolyte solution (100 g) was prepared in which propylene carbonate (PC), ethylmethyl carbonate (EMC), and dimethyl carbonate (DMC) were included in a ratio of 2:4:4 (vol %). A non-aqueous electrolyte solution of the present invention was prepared by adding 3 wt % of an additive (weight ratio of 1,3-propane sultone (PS):succinic anhydride (SA):tris(trimethylsilyl)borate (TMSB):succinonitrile (SN)=1:0.5:0.5:0.5) based on 100 wt % of the electrolyte solution (see Table 1 below).

Example 3. Non-Aqueous Electrolyte Solution Preparation

A 1M LiPF$_6$ electrolyte solution (100 g) was prepared in which propylene carbonate (PC), ethylmethyl carbonate (EMC), and dimethyl carbonate (DMC) were included in a ratio of 2:4:4 (vol %). A non-aqueous electrolyte solution of the present invention was prepared by adding 2.5 wt % of an additive (weight ratio of 1,3-propane sultone (PS):succinic anhydride (SA):tris(trimethylsilyl)borate (TMSB):succinonitrile (SN)=1:1:1:1) based on 100 wt % of the electrolyte solution (see Table 1 below).

Example 4. Non-Aqueous Electrolyte Solution Preparation

A 1M LiPF$_6$ electrolyte solution (100 g) was prepared in which propylene carbonate (PC), ethylmethyl carbonate (EMC), and dimethyl carbonate (DMC) were included in a ratio of 2:4:4 (vol %). A non-aqueous electrolyte solution of the present invention was prepared by adding 4 wt % of an additive (weight ratio of 1,3-propane sultone (PS):succinic anhydride (SA):tris(trimethylsilyl)borate (TMSB):succinonitrile (SN)=1:1:1:1) based on 100 wt % of the electrolyte solution (see Table 1 below).

Comparative Example 1

A non-aqueous electrolyte solution for a lithium secondary battery was prepared in the same manner as in Example 1 except that an additive was not added (see Table 1 below).

Comparative Example 2

A non-aqueous electrolyte solution was prepared in the same manner as in Example 1 except that 4.5 wt % of an additive, in which 1,3-propane sultone (PS), succinic anhydride (SA), succinonitrile (SN), and tris(trimethylsilyl)borate (TMSB) were included in a weight ratio of 1:0.5:0.5:0.5, was included (see Table 1 below).

Comparative Example 3

A non-aqueous electrolyte solution was prepared in the same manner as in Example 1 except that 4 wt % of an additive, in which 1,3-propane sultone (PS), succinic anhydride (SA), succinonitrile (SN), and tris(trimethylsilyl)borate (TMSB) were included in a weight ratio of 3:0.5:0.5:0.5, was included (see Table 1 below).

Comparative Example 4

A non-aqueous electrolyte solution was prepared in the same manner as in Example 1 except that 4 wt % of an additive, in which 1,3-propane sultone (PS), succinic anhydride (SA), succinonitrile (SN), and tris(trimethylsilyl)borate (TMSB) were included in a weight ratio of 1:0.5:2:0.5, was included (see Table 1 below).

Comparative Example 5

A non-aqueous electrolyte solution was prepared in the same manner as in Example 1 except that 5 wt % of an additive, in which 1,3-propane sultone (PS), succinic anhydride (SA), succinonitrile (SN), and tris(trimethylsilyl)borate (TMSB) were included in a weight ratio of 1:3:0.5:0.5, was included (see Table 1 below).

Comparative Example 6

A non-aqueous electrolyte solution was prepared in the same manner as in Example 1 except that 3 wt % of an additive, in which 1,3-propane sultone (PS), succinic anhydride (SA), succinonitrile (SN), and tris(trimethylsilyl)borate (TMSB) were included in a weight ratio of 1:0.5:0.5:2, was included (see Table 1 below).

Comparative Example 7

A non-aqueous electrolyte solution was prepared in the same manner as in Example 1 except that 4 wt % of an additive, in which 1,3-propane sultone (PS), succinic anhydride (SA), succinonitrile (SN), and tris(trimethylsilyl)borate (TMSB) were included in a weight ratio of 1:0:0.5:0, was included (see Table 1 below).

Comparative Example 8

A non-aqueous electrolyte solution was prepared in the same manner as in Example 1 except that 4 wt % of an additive, in which 1,3-propane sultone (PS), succinic anhydride (SA), succinonitrile (SN), and tris(trimethylsilyl)borate (TMSB) were included in a weight ratio of 1:0:0.5:0.5, was included (see Table 1 below).

Comparative Example 9

A non-aqueous electrolyte solution was prepared in the same manner as in Example 1 except that 4 wt % of an additive, in which 1,3-propane sultone (PS), succinic anhydride (SA), succinonitrile (SN), and tris(trimethylsilyl)borate (TMSB) were included in a weight ratio of 1:0.5:0.5:0, was included (see Table 1 below).

II. Battery Preparation

Example 5

40 parts by weight of a mixture, in which a positive electrode active material (lithium cobalt composite oxide (LiCO$_2$)), a conductive agent (carbon black), and a binder (polyvinylidene fluoride (PVDF)) were mixed in a weight ratio of 90:5:5, was added based on 100 parts by weight of N-methyl-2-pyrrolidone (NMP), as a solvent, to prepare a positive electrode material mixture. A 20 µm thick positive electrode collector (Al thin film) was coated with the positive electrode material mixture, dried, and roll-pressed to prepare a positive electrode.

(Negative Electrode Preparation)

40 parts by weight of a mixture, in which a negative electrode active material (LTO), a conductive agent (carbon black), and a binder (polyvinylidene fluoride (PVDF)) were mixed in a weight ratio of 90:5:5, was added based on 100 parts by weight of N-methyl-2-pyrrolidone (NMP), as a solvent, to prepare a negative electrode material mixture. A 20 µm thick negative electrode collector (Al thin film) was coated with the negative electrode material mixture, dried, and roll-pressed to prepare a negative electrode.

(Secondary Battery Preparation)

A coin-type cell was prepared by a typical method in which the positive electrode and negative electrode prepared by the above-described method were sequentially stacked with a polyethylene porous film, and a lithium secondary battery (battery capacity 340 mAh) was then prepared by injecting the prepared non-aqueous electrolyte solution of Example 1 thereinto (see Table 1 below).

Example 6

A negative electrode, a positive electrode, and a lithium secondary battery including the negative electrode and positive electrode were prepared in the same manner as in Example 5 except that the non-aqueous electrolyte solution of Example 2 was used instead of the non-aqueous electrolyte solution of Example 1 (see Table 1 below).

Example 7

A negative electrode, a positive electrode, and a lithium secondary battery including the negative electrode and positive electrode were prepared in the same manner as in Example 5 except that the non-aqueous electrolyte solution of Example 3 was used instead of the non-aqueous electrolyte solution of Example 1 (see Table 1 below).

Example 8

A negative electrode, a positive electrode, and a lithium secondary battery including the negative electrode and positive electrode were prepared in the same manner as in Example 5 except that the non-aqueous electrolyte solution of Example 4 was used instead of the non-aqueous electrolyte solution of Example 1 (see Table 1 below).

Comparative Example 10

A negative electrode, a positive electrode, and a lithium secondary battery including the negative electrode and positive electrode were prepared in the same manner as in Example 5 except that the non-aqueous electrolyte solution of Comparative Example 1 was used instead of the non-aqueous electrolyte solution of Example 1 (see Table 1 below).

Comparative Example 11

A negative electrode, a positive electrode, and a lithium secondary battery including the negative electrode and positive electrode were prepared in the same manner as in Comparative Example 10 except that the non-aqueous electrolyte solution of Comparative Example 2 was used instead of the non-aqueous electrolyte solution of Comparative Example 1 (see Table 1 below).

Comparative Example 12

A negative electrode, a positive electrode, and a lithium secondary battery including the negative electrode and positive electrode were prepared in the same manner as in Comparative Example 10 except that the non-aqueous electrolyte solution of Comparative Example 3 was used instead of the non-aqueous electrolyte solution of Comparative Example 1 (see Table 1 below).

Comparative Example 13

A negative electrode, a positive electrode, and a lithium secondary battery including the negative electrode and positive electrode were prepared in the same manner as in Comparative Example 10 except that the non-aqueous electrolyte solution of Comparative Example 4 was used instead of the non-aqueous electrolyte solution of Comparative Example 1 (see Table 1 below).

Comparative Example 14

A negative electrode, a positive electrode, and a lithium secondary battery including the negative electrode and positive electrode were prepared in the same manner as in Comparative Example 10 except that the non-aqueous electrolyte solution of Comparative Example 5 was used instead of the non-aqueous electrolyte solution of Comparative Example 1 (see Table 1 below)

Comparative Example 15

A negative electrode, a positive electrode, and a lithium secondary battery including the negative electrode and positive electrode were prepared in the same manner as in Comparative Example 10 except that the non-aqueous electrolyte solution of Comparative Example 6 was used instead of the non-aqueous electrolyte solution of Comparative Example 1 (see Table 1 below)

Comparative Example 16

A negative electrode, a positive electrode, and a lithium secondary battery including the negative electrode and positive electrode were prepared in the same manner as in Comparative Example 10 except that the non-aqueous electrolyte solution of Comparative Example 7 was used instead of the non-aqueous electrolyte solution of Comparative Example 1 (see Table 1 below)

Comparative Example 17

A negative electrode, a positive electrode, and a lithium secondary battery including the negative electrode and positive electrode were prepared in the same manner as in Comparative Example 10 except that the non-aqueous electrolyte solution of Comparative Example 8 was used instead of the non-aqueous electrolyte solution of Comparative Example 1 (see Table 1 below)

Comparative Example 18

A negative electrode, a positive electrode, and a lithium secondary battery including the negative electrode and positive electrode were prepared in the same manner as in Comparative Example 10 except that the non-aqueous electrolyte solution of Comparative Example 9 was used instead of the non-aqueous electrolyte solution of Comparative Example 1 (see Table 1 below).

Comparative Example 19

(Positive Electrode Preparation)

40 parts by weight of a mixture, in which a positive electrode active material (lithium cobalt composite oxide ($LiCO_2$)), a conductive agent (carbon black), and a binder (polyvinylidene fluoride (PVDF)) were mixed in a weight ratio of 90:5:5, was added based on 100 parts by weight of N-methyl-2-pyrrolidone (NMP), as a solvent, to prepare a positive electrode material mixture. A 20 μm thick positive electrode collector (Al thin film) was coated with the positive electrode material mixture, dried, and roll-pressed to prepare a positive electrode.

(Negative Electrode Preparation)

80 parts by weight of a mixture, in which natural graphite, a binder (styrene-butadiene rubber (SBR)), and a conductive agent (carbon black) were mixed in a ratio of 95:2:3 (wt %), was added based on 100 parts by weight of water ($H_2O$) to prepare a negative electrode material mixture. A 20 μm thick negative electrode collector (Cu thin film) was coated with the negative electrode material mixture, dried, and roll-pressed to prepare a negative electrode.

(Secondary Battery Preparation)

A coin-type cell was prepared by a typical method in which the positive electrode and negative electrode prepared by the above-described method were sequentially stacked with a polyethylene porous film, and a lithium secondary battery (battery capacity 5.5 mAh) was then prepared by injecting the non-aqueous electrolyte solution prepared in Example 1 thereinto (see Table 1 below).

Experimental Examples

Experimental Example 1. Gas Reduction Effect Measurement

An experiment was performed under conditions in which, after each of the secondary batteries prepared in Example 5 and Comparative Example 12 was charged at a voltage of 4.20 V, the secondary batteries were heated from room temperature to 80° C. at a heating rate of 1° C./min, stored at 80° C. for about 30 days, and then cooled to room temperature for 3 hours. A degree of gas generation in each battery (swelling of battery) according to the time was measured, and the results thereof are presented in FIG. 1 below.

As illustrated in FIG. 1, with respect to the secondary battery of Example 5 in which the electrolyte solution including 1,3-propane sultone, as the first additive, in a weight ratio of 1 was used, the degree of gas generation (swelling of battery) was not large even though the secondary battery was stored for a long period of time at high temperature, but, with respect to the secondary battery of Comparative Example 12 in which the electrolyte solution including 1,3-propane sultone in a weight ratio of 3 was used, the gas generation was increased by about 48% in comparison to the secondary battery of Example 5.

Experimental Example 2. Gas Reduction Effect Measurement

An experiment was performed under conditions in which, after each of the secondary batteries prepared in Example 6 and Comparative Example 19 was charged at a voltage of 4.20 V, the secondary batteries were heated from room temperature to 80° C. at a heating rate of 1° C./min, stored at 80° C. for about 30 days, and then cooled to room

TABLE 1

| Secondary battery | Negative electrode | Non-aqueous electrolyte additive | | | | |
|---|---|---|---|---|---|---|
| | | | 1,3-propane sultone (weight ratio) | succinic anhydride (weight ratio) | succinonitrile (weight ratio) | tris(trimethyl-silyl)borate (weight ratio) | Total amount of additive (wt %) |
| Example 5 | LTO | Example 1 | 1 | 0.5 | 0.5 | 0.5 | 2.5 |
| Example 6 | LTO | Example 2 | 1 | 0.5 | 0.5 | 0.5 | 3 |
| Example 7 | LTO | Example 3 | 1 | 1 | 1 | 1 | 2.5 |
| Example 8 | LTO | Example 4 | 1 | 1 | 1 | 1 | 4 |
| Comparative Example 10 | LTO | Comparative Example 1 | — | — | — | — | — |
| Comparative Example 11 | LTO | Comparative Example 2 | 1 | 0.5 | 0.5 | 0.5 | 4.5 |
| Comparative Example 12 | LTO | Comparative Example 3 | 3 | 0.5 | 0.5 | 0.5 | 4 |
| Comparative Example 13 | LTO | Comparative Example 4 | 1 | 0.5 | 2 | 0.5 | 4 |
| Comparative Example 14 | LTO | Comparative Example 5 | 1 | 3 | 0.5 | 0.5 | 5 |
| Comparative Example 15 | LTO | Comparative Example 6 | 1 | 0.5 | 0.5 | 2 | 3 |
| Comparative Example 16 | LTO | Comparative Example 7 | 1 | 0 | 0.5 | 0 | 4 |
| Comparative Example 17 | LTO | Comparative Example 8 | 1 | 0 | 0.5 | 0.5 | 4 |
| Comparative Example 18 | LTO | Comparative Example 9 | 1 | 0.5 | 0.5 | 0 | 4 |
| Comparative Example 19 | Natural graphite | Example 1 | 1 | 0.5 | 0.5 | 0.5 | 2.5 | temperature for 3 hours. A degree of gas generation in each battery (swelling of battery) according to the time was measured, and the results thereof are presented in FIG. 2 below.

Figure 2:
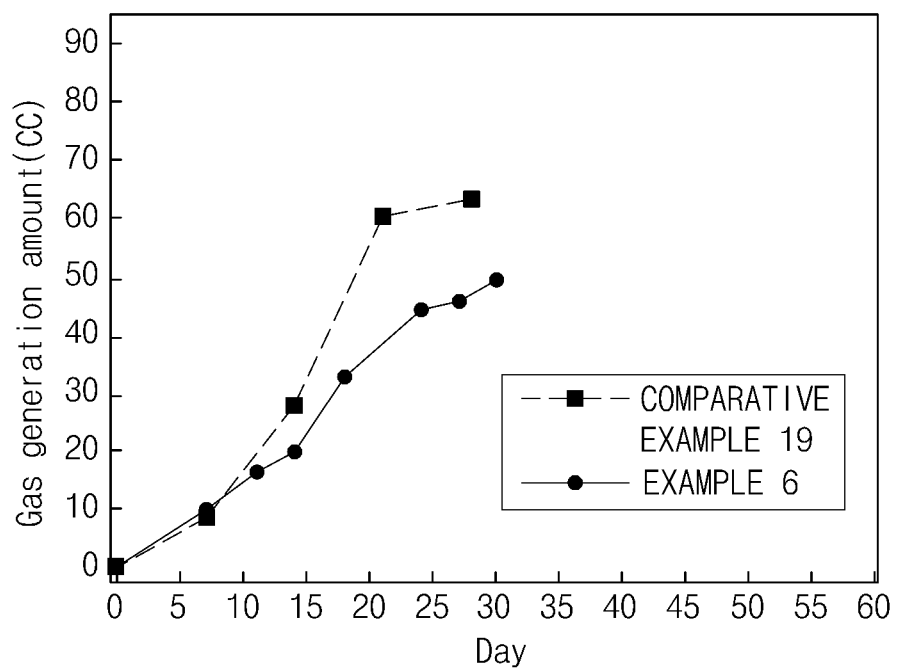
FIG. 2 is a graph illustrating a gas reduction effect according to Experimental Example 2 of the present invention.

As illustrated in FIG. 2, with respect to the secondary battery of Example 6 including the LTO negative electrode, a gas (i.e., degree of swelling of battery) reduction effect was excellent even though the secondary battery was stored for a long period of time at high temperature in comparison to the secondary battery of Comparative Example 19 including the natural graphite negative electrode. Thus, it may be understood that high-temperature storage performance was excellent.

Experimental Example 3. Gas Reduction Effect Measurement

An experiment was performed under conditions in which, after each of the secondary batteries prepared in Example 6 and Comparative Example 11 was charged at a voltage of 4.20 V, the secondary batteries were heated from room temperature to 90° C. at a heating rate of 1° C./min, stored at 80° C. for about 45 days, and then cooled to room temperature for 3 hours. A degree of gas generation in each battery (swelling of battery) according to the time was measured, and the results thereof are presented in FIG. 3 below.

Figure 3:
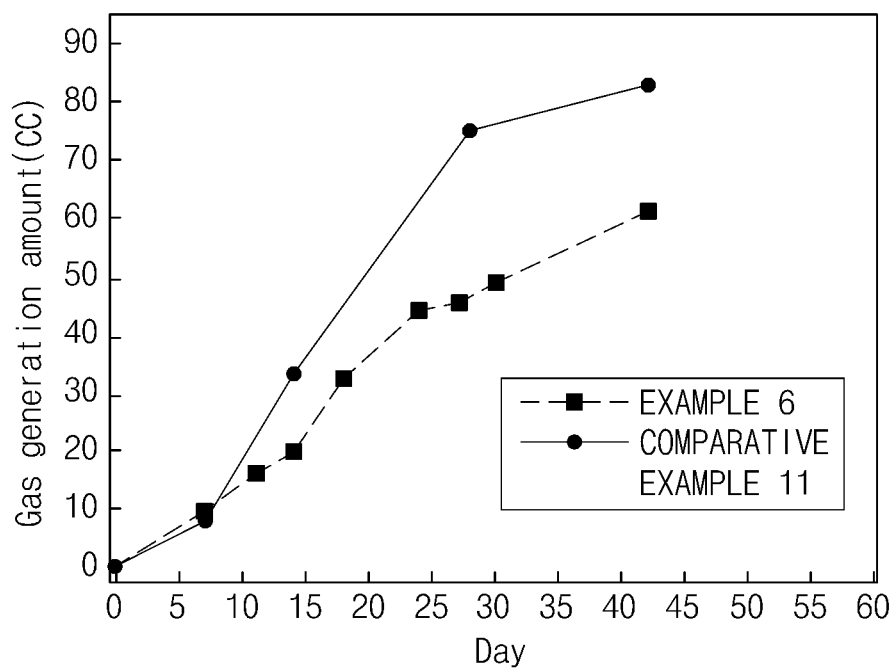
FIG. 3 is a graph illustrating a gas reduction effect according to Experimental Example 3 of the present invention.

As illustrated in FIG. 3, with respect to the battery of Example 6 in which the electrolyte solution including 4 wt % or less of the additive in the non-aqueous electrolyte solution was used, a gas (swelling of battery) reduction effect was excellent even though the secondary battery was stored for a long period of time at high temperature in comparison to the secondary battery of Comparative Example 11 in which the electrolyte solution including greater than 4 wt % of the additive was used. Thus, it may be understood that high-temperature storage performance was excellent.

Experimental Example 4. Gas Reduction Effect Measurement

An experiment was performed under conditions in which, after the secondary batteries prepared in Example 7 and Comparative Example 13 were charged at a voltage of 4.20 V, the secondary batteries were heated from room temperature to 80° C. at a heating rate of 1° C./min, stored at 80° C. for about 5 weeks, and then cooled to room temperature for 3 hours. A degree of gas generation in each battery (swelling of battery) according to the time was measured, and the results thereof are presented in FIG. 4 below.

Figure 4:
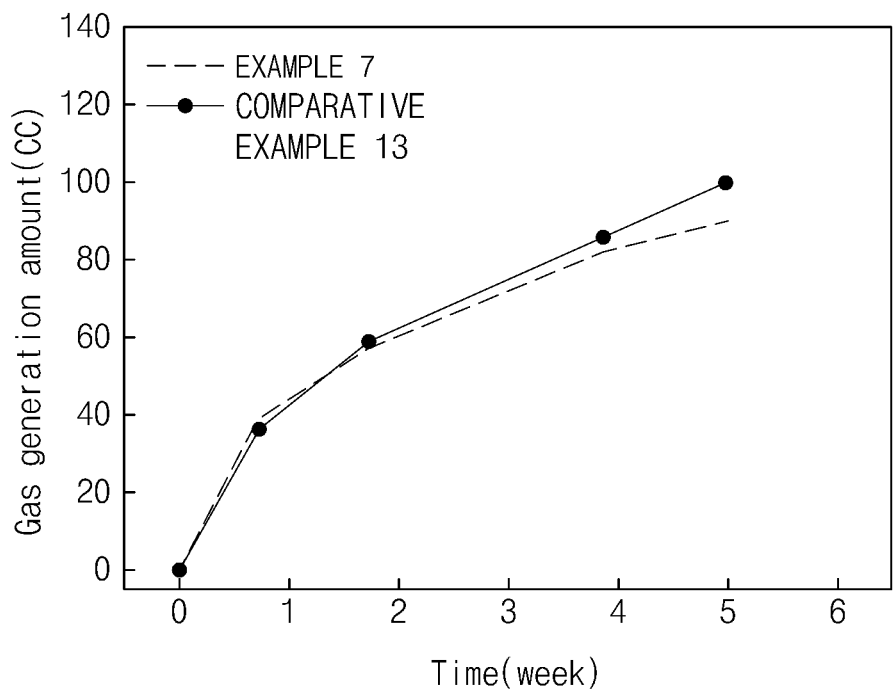
FIG. 4 is a graph illustrating a gas reduction effect according to Experimental Example 4 of the present invention.

As illustrated in FIG. 4, with respect to the battery of Example 7 in which the electrolyte solution including succinonitrile in a weight ratio of 1 was used, a gas (swelling of battery) reduction effect was excellent even though the secondary battery was stored for a long period of time at high temperature in comparison to the battery of Comparative Example 13 in which the electrolyte solution including succinonitrile in a weight ratio of 2 was used.

Experimental Example 5. Gas Reduction Effect Measurement

An experiment was performed under conditions in which, after each of the secondary batteries prepared in Example 8 and Comparative Example 14 was charged at a voltage of 4.20 V, the secondary batteries were heated from room temperature to 80° C. at a heating rate of 1° C./min, stored at 80° C. for about 2 weeks, and then cooled to room temperature for 1 hour. A degree of changes in thickness of the battery (swelling of battery) according to the time was measured, and the results thereof are presented in FIG. 5 below.

Figure 5:
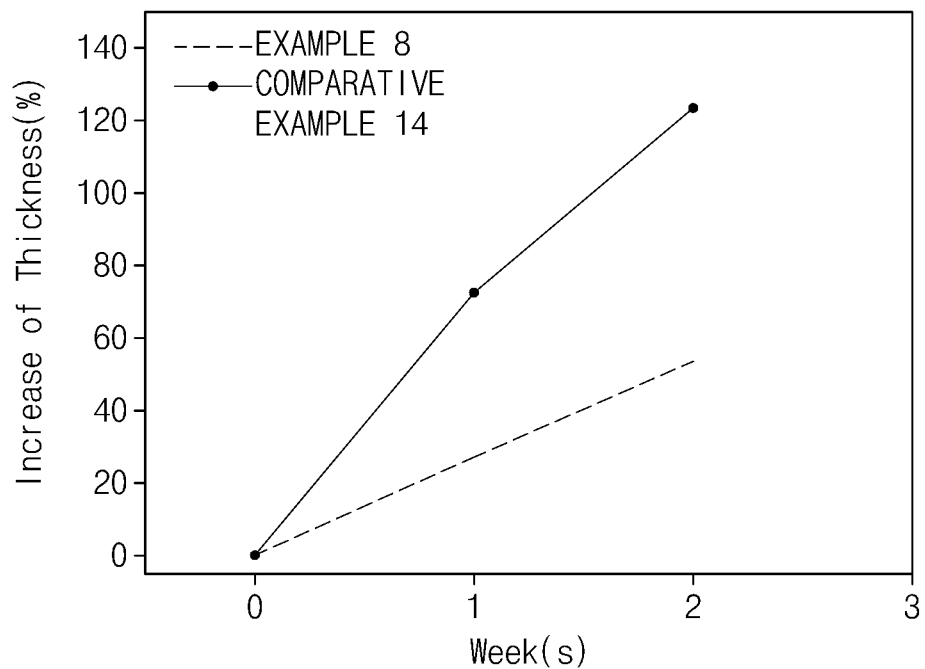
FIG. 5 is a graph illustrating a battery thickness increase effect according to Experimental Example 5 of the present invention.

As illustrated in FIG. 5, with respect to the battery of Example 8 in which the electrolyte solution including succinic anhydride in a weight ratio of 1 was used, it may be understood that changes in thickness of the battery (swelling of battery) were not large even though the battery was stored for a long period of time at high temperature in comparison to the battery of Comparative Example 14 in which the electrolyte solution including succinic anhydride in a weight ratio of 3 was used.

Experimental Example 6. Measurement of Increase in Side Reaction

An experiment was performed under conditions in which, after each of the secondary batteries prepared in Example 8 and Comparative Example 15 was charged at a voltage of 4.20 V, the secondary batteries were heated from room temperature to 80° C. at a heating rate of 1° C./min, stored at 80° C. for about weeks, and then cooled to room temperature for 3 hours. Changes in open circuit voltage (OCV) were measured, and the results thereof are presented in FIG. 6 below.

Figure 6:
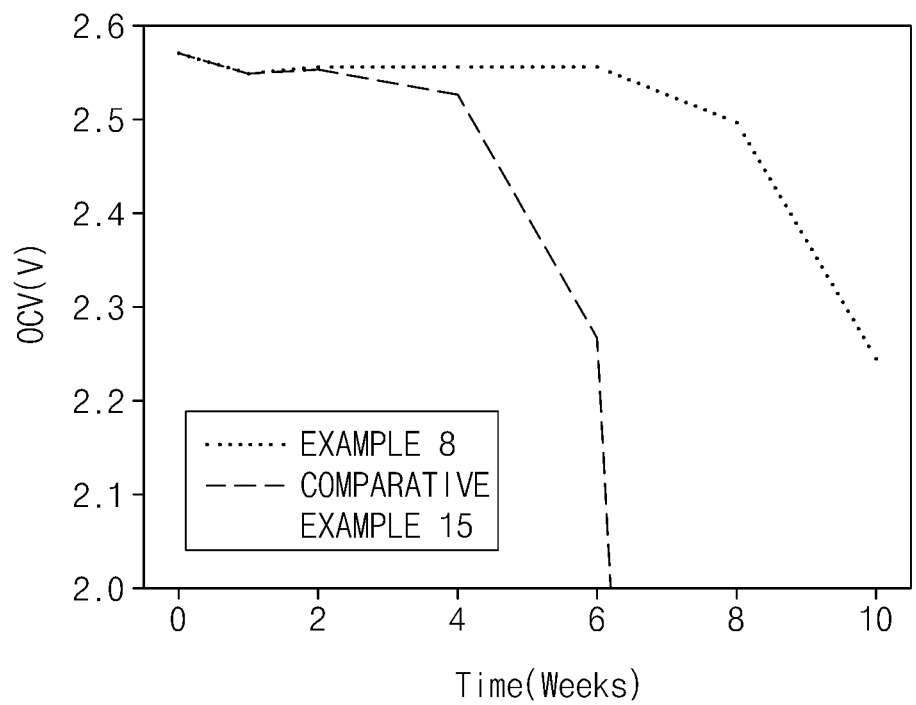
FIG. 6 is a graph illustrating changes in open circuit voltage (OCV) of a battery according to Experimental Example 6 of the present invention.

As illustrated in FIG. 6, with respect to the secondary battery of Example 8 in which the electrolyte solution including tris(trimethylsilyl)borate in a weight ratio of 1 was used, since a side reaction at an interface of the positive electrode material did not occur, an OCV drop phenomenon was significantly suppressed even over time, but changes in OCV in the secondary battery of Comparative Example 15 were relatively large due to the fact that the side reaction at the interface of the positive electrode material occurred in the secondary battery of Comparative Example 14 in which the electrolyte solution including tris(trimethylsilyl)borate in a weight ratio of 2 was used. From these results, it may be understood that the tris(trimethylsilyl)borate further improved interface stability of the positive electrode material.

Experimental Example 7. Gas Reduction Effect Measurement

An experiment was performed under conditions in which, after each of the secondary batteries prepared in Example 7, Comparative Example 10, and Comparative Examples 16 to 18 was charged at a voltage of 4.20 V, the secondary batteries were heated from room temperature to 80° C. at a heating rate of 1° C./min, stored at 80° C. for about 5 weeks, and then cooled to room temperature for 3 hours. A degree of changes in thickness of the battery (swelling of battery) according to the time was measured, and the results thereof are presented in FIG. 7 below.

Figure 7:
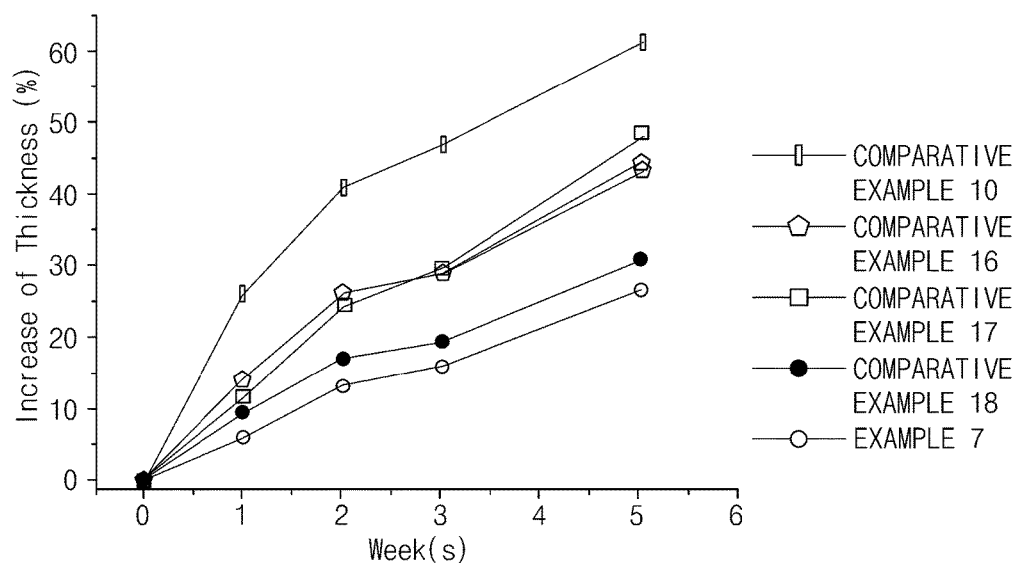
FIG. 7 is a graph illustrating a thickness increase effect according to Experimental Example 7 of the present invention.

As illustrated in FIG. 7, with respect to the secondary battery of Example 7, changes in thickness of the battery (i.e., degree of swelling of battery) were not large even though the secondary battery was stored for a long period of time at high temperature in comparison to the batteries of Comparative Example 10 and Comparative Examples 16 to 18.

Experimental Example 8. Measurement of Increase in Charge and Discharge Resistance at High Temperature An experiment was performed under conditions in which, after each of the batteries prepared in Example 8, Comparative Example 10, and Comparative Examples 16 to 18 was charged at a voltage of 4.20 V, the secondary batteries were heated from room temperature to 80° C. at a heating rate of 1° C./min, stored at 80° C. for about 6 weeks, and then cooled to room temperature for 3 hours. Changes in resistance of the battery according to the time were measured, and the results thereof are presented in FIG. 8 below.

Figure 8:
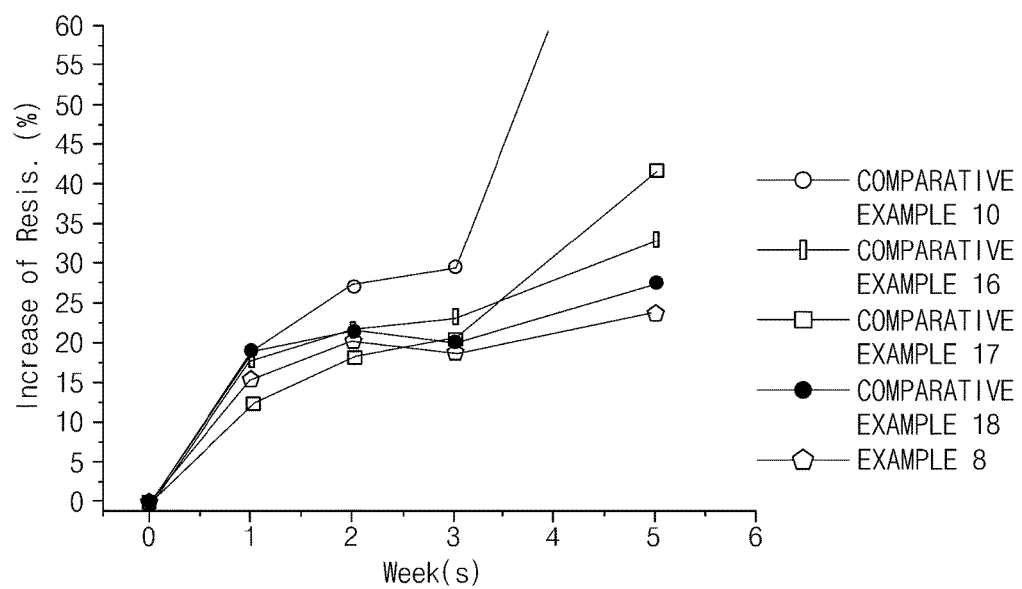
FIG. 8 is a graph illustrating a resistance increase effect according to Experimental Example 8 of the present invention.

As illustrated in FIG. 8, it may be understood that, with respect to the battery of Example 8, an increase in resistance was not large even though the battery was stored for a long period of time at high temperature in comparison to the secondary batteries of Comparative Example 10 and Comparative Examples 16 to 18.

The invention claimed is:

1. A non-aqueous electrolyte solution for a lithium secondary battery, the non-aqueous electrolyte solution comprising:
   an ionizable lithium salt;
   an organic solvent; and
   an additive,
   wherein the additive comprises 1,3-propane sultone, succinic anhydride, tris(trimethylsilyl)borate, and succinonitrile in a weight ratio of 1:0.5:0.5:0.5 to 1:1:1:1, and
   a total amount of the additive is in a range of 2.5 wt % to 4 wt % based on a total weight of the non-aqueous electrolyte solution for a lithium secondary battery.

2. The non-aqueous electrolyte solution for a lithium secondary battery of claim 1, wherein the additive comprises 1,3-propane sultone, succinic anhydride, tris(trimethylsilyl) borate, and succinonitrile in a weight ratio of 1:0.5:0.5:0.5.

3. The non-aqueous electrolyte solution for a lithium secondary battery of claim 1, wherein the total amount of the additive is in a range of 2.5 wt % to 3 wt % based on the total weight of the non-aqueous electrolyte solution for a lithium secondary battery.

4. The non-aqueous electrolyte solution for a lithium secondary battery of claim 1, wherein the lithium salt comprises $Li^+$ as a cation, and comprises any one selected from the group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $BF_2C_2O_4^-$, $BC_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(F_2SO_2)_2N^-$, $CF_3CF_2(CF_3)_2CO^-$, $(CF_3SO_2)_2CH^-$, $CF_3(CF_2)_7SO_3^-$, $CF_3CO_2^-$, $CH_3CO_2^-$, $SCN^-$, and $(CF_3CF_2SO_2)_2N^-$ as an anion.

5. The non-aqueous electrolyte solution for a lithium secondary battery of claim 1, wherein the organic solvent comprises any one selected from the group consisting of an ether compound, an ester compound, an amide compound, a linear carbonate compound, and a cyclic carbonate compound, or a mixture of two or more thereof.

6. A lithium secondary battery comprising:
   a negative electrode;
   a positive electrode;
   a separator disposed between the negative electrode and the positive electrode; and
   a non-aqueous electrolyte solution,
   wherein the non-aqueous electrolyte solution comprises the non-aqueous electrolyte solution for a lithium secondary battery of claim 1, and
   the negative electrode comprises a lithium titanium oxide (LTO) as a negative electrode active material.

7. The lithium secondary battery of claim 6, wherein the lithium titanium oxide comprises a compound represented by Formula 1:

$$Li_xTi_yO_4 \qquad \text{[Formula 1]}$$

wherein $0.5 \leq x \leq 3$ and $1 \leq y \leq 2.5$.

* * * * *